(12) United States Patent
Korell

(10) Patent No.: US 11,213,968 B2
(45) Date of Patent: Jan. 4, 2022

(54) BREAD CUTTING MACHINE WITH BLADE GUARD

(71) Applicant: Bizerba SE & Co. KG, Balingen (DE)

(72) Inventor: Leo Korell, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 16/989,933

(22) Filed: Aug. 11, 2020

(65) Prior Publication Data

US 2021/0053246 A1 Feb. 25, 2021

(30) Foreign Application Priority Data

Aug. 20, 2019 (EP) .................................... 19192627

(51) Int. Cl.
*B26D 7/22* (2006.01)
*B26D 1/16* (2006.01)

(52) U.S. Cl.
CPC .............. *B26D 7/225* (2013.01); *B26D 1/16* (2013.01)

(58) Field of Classification Search
CPC . B26D 7/225; B26D 1/16; B26D 1/18; B26D 7/2621; B23D 45/063; B23D 59/001; B24B 27/0666; B24B 55/04
USPC ....................................... 83/398, 397, 397.1
See application file for complete search history.

(56) References Cited

U.S. PATENT DOCUMENTS

| 4,077,161 A * | 3/1978 | Wyle ................... B23D 45/063 451/231 |
| 5,125,333 A * | 6/1992 | Gourley, III ........ B02C 19/0081 100/102 |
| 2007/0151431 A1* | 7/2007 | Bassler ................ B26D 7/2621 83/113 |

FOREIGN PATENT DOCUMENTS

| DE | 3706485 A1 | 10/1988 |
| DE | 102011010935 A1 | 8/2012 |
| DE | 102012002489 A1 | 8/2013 |
| EP | 0044925 A2 | 2/1982 |
| EP | 2667080 A2 | 11/2013 |

* cited by examiner

*Primary Examiner* — Evan H MacFarlane
*Assistant Examiner* — Liang Dong
(74) *Attorney, Agent, or Firm* — Leydig, Voit & Mayer, Ltd.

(57) ABSTRACT

A bread cutting machine has a circular blade that is moveable in a guide gap through an extension gap of a machine housing from a waiting position into a cutting space. When the blade is in the waiting position, the guide gap is coverable by a rocker displaceable away from the guide gap simultaneously with the extension of the blade from the waiting position, whereby the guide gap is opened. A cover plate is rigidly fastened to a side surface of the rocker, projects vertically away from the rocker, and covers the extension gap whenever the blade is in the waiting position. By a positive guide, the cover plate is moveable away from the extension gap simultaneously with the movement of the rocker, whereby the extension gap is opened.

13 Claims, 12 Drawing Sheets

BREAD CUTTING MACHINE WITH BLADE GUARD

CROSS-REFERENCE TO PRIOR APPLICATIONS

Priority is claimed to European Patent Application No. 19 192 627.8, filed on Aug. 20, 2019, the entire disclosure of which is hereby incorporated by reference herein.

FIELD

The invention relates to a bread cutting machine for cutting off slices of cuttable material, in particular bread.

BACKGROUND

Bread cutting machines are known. For example, EP 2 667 080 A2 describes a cutting machine with a motor-driven rotating blade. The blade is covered by a hood which is locked during cutting. Unlocking takes place by a safety device with signal processing as soon as the rotational speed of the blade has fallen below a limit rotational speed. When the blade is not in operation, it is located in the machine housing of the cutting machine. For cutting, the blade is moved out of the machine housing in the direction of a cutting region.

SUMMARY

A bread cutting machine cuts off slices of cuttable material. The bread cutting machine has a cutting device having a circular blade, which is mounted in a waiting position in a machine housing and configured to be driven by a motor enclosed by the machine housing. The circular blade is rotatably fastened to a blade arm. A cutting space for the cuttable material is formed on or in the machine housing. The cutting space has a guide gap. The circular blade is moveable in the guide gap through an extension gap of the machine housing from the waiting position into the cutting space by moving the guide arm. A hood for covering the circular blade in operation is arranged on the machine housing. The hood has a locking mechanism by which the hood is locked whenever the circular blade is in the cutting space or in the operating state. When the circular blade is in the waiting position, the guide gap is coverable by a rocker displaceable orthogonally to a movement direction of the circular blade. The rocker is displaceable away from the guide gap simultaneously with the extension of the circular blade from the waiting position, whereby the guide gap is opened. A cover plate is rigidly fastened to a cuttable-material-side surface of the rocker, projects essentially vertically away from the rocker, and covers the extension gap whenever the circular blade is in the waiting position. By a positive guide, the cover plate is moveable away from the extension gap simultaneously with the movement of the rocker, whereby the extension gap is opened.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
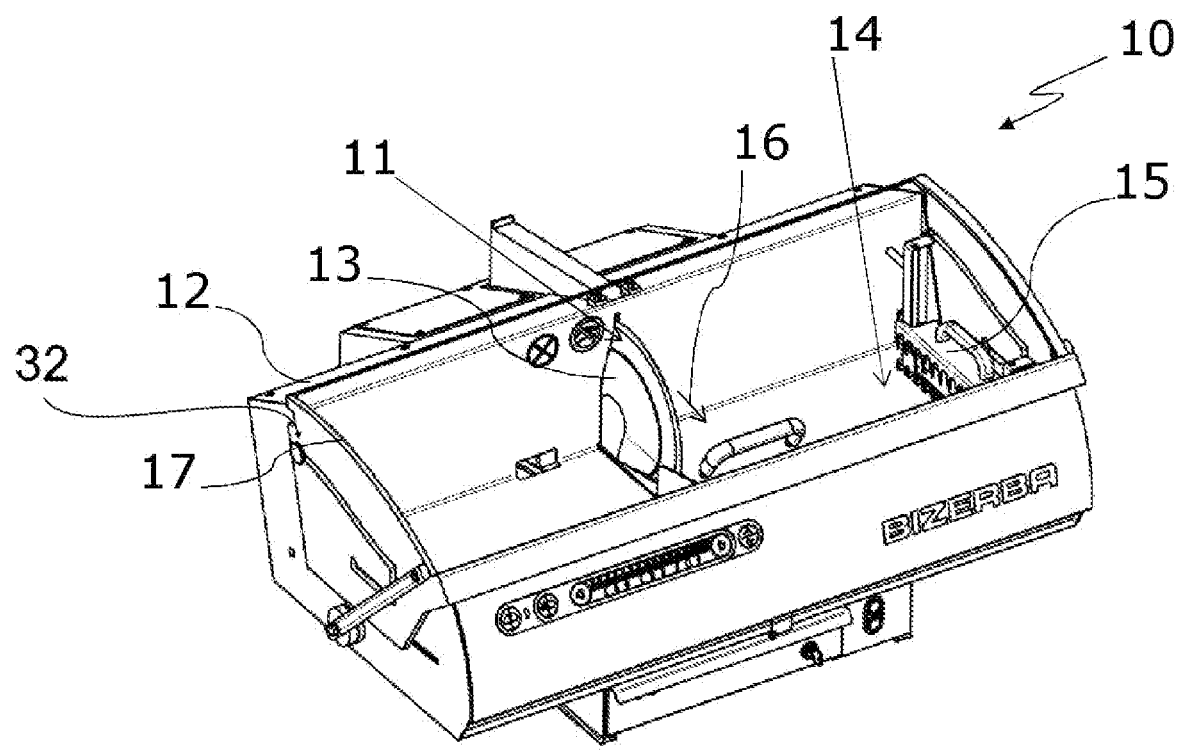
FIG. 1 an isometric view of the bread cutting machine according to the invention with a hood.

A bread cutting machine cuts off slices of cuttable material, such as bread, with a cutting device. The cutting device may include a circular blade, which is mounted in a waiting position in a machine housing and driven by a motor enclosed by the machine housing. The circular blade is rotatably fastened to a blade arm. A cutting space for the cuttable material is formed on or in the machine housing. The cutting space has a guide gap. The circular blade can be moved in the guide gap through an extension gap of the machine housing from the waiting position into the cutting space by moving the guide arm. A hood for covering the rotating circular blade in operation is arranged on the machine housing. The hood has a locking mechanism by which the hood is locked whenever the circular blade is in the cutting space and/or in the operating state. The guide gap can be covered by a rocker displaceable orthogonally to the movement direction of the circular blade. The rocker is displaceable away from the guide gap simultaneously with the extension of the circular blade from the waiting position, whereby the guide gap is opened.

Conventional bread cutting machines do not have any structurally simple protection against a user reaching through an extension gap into a machine housing containing a circular cutting blade, thereby risking injury on the circular blade.

In contrast, the present invention is based on the task, which is relatively demanding when considered in detail, of providing a bread cutting machine with a structurally simple and space-saving protection of a user from the circular blade located in the waiting position in the machine housing.

The present invention provides such a bread cutting machine in a manner that is as surprisingly simple as it is effective, in that a cover plate is rigidly fastened to a cuttable-material-side surface of the rocker, projects essentially vertically away from the rocker, and covers the extension gap whenever the circular blade is in the waiting position, wherein, by means of a positive guide, the cover plate can be moved away from the extension gap simultaneously with the movement of the rocker, whereby the extension gap is opened.

The previously always present risk of injury when reaching through the extension gap into the machine housing when the circular blade is in the waiting position is now completely avoided. When the circular blade is mounted in the waiting position in the machine housing, the cover plate covers the extension gap behind which the circular blade is located (as seen from the cutting space). As a result, the user of the bread cutting machine cannot reach into the slot and accidentally injure themselves on the circular blade. The cover plate thus increases the protection for the user of the bread cutting machine. The protection is easily removable in order to extend the circular blade. This is because the rigid connection of the cover plate to the rocker and the simultaneous movement of the cover plate with the rocker enable the simultaneous opening of the extension gap and of the guide gap in a simple and space-saving manner when the circular blade is moved into the cutting space.

A class of advantageous embodiments of the bread cutting machine according to embodiments the invention is characterized in that the cover plate can be displaced, in particular linearly, together with the rocker or in that a swivel mechanism is provided, which swings open the cover plate when the rocker is displaced. The cover plate can in particular be displaced along the machine housing. When the cover plate is displaced within the machine housing, it is also well protected from external influences during the displacement. A cover plate swinging open continues to cover the extension gap on one or both side of the circular blade and develops a protective effect, even while the circular blade moves out of the extension gap. The bread cutting machine according to the invention may also fulfill safety standards (cf. DIN EN ISO 13857 or DIN EN 13954:2005+A1:2010), which apply to the handling of bread cutting machines by untrained personnel, for example in the field of self-service. In the mounted state, the cover plate may be guided at the upper edge in a rail.

Embodiments of the bread cutting machine according to the invention, characterized in that the locking mechanism is designed such that the hood is locked whenever the circular blade is in the cutting space, are particularly preferred. The hood protects the user of the bread cutting machine from the exposed circular blade, in particular when the circular blade is in operation.

The locking mechanism may be designed such that the circular blade can only be moved into the cutting space when the hood is locked. This additionally ensures that the circular blade is not exposed when the user can touch it without protection.

Embodiments of the invention, with which a pin connection to the rocker is present in the mounted state of the cover plate, are also particularly preferred. As an alternative to pins, screws or dowels may also be used. Such a positive-locking connection constitutes a non-destructively releasable and space-saving connection.

Further, more particularly advantageous embodiments of the invention are characterized in that the cover plate and the rocker have an adhesive connection and/or a welded connection. This makes it possible to produce a stable frictional connection.

Embodiments of the invention with which the rocker has a recess, in particular a groove, into which the cover plate is inserted in the mounted state, are also particularly preferred. As a result of the positive connection of the rocker and the cover plate, the connection is better stabilized against displacement forces along the surface of the rocker, which act on the cover plate.

Embodiments of the bread cutting machine according to the invention, with which the cover plate has a base for stably supporting the cover plate on the rocker, which base preferably also contains openings for receiving screws and/or pins, are also advantageous. As a result of the openings, the connections can be established particularly easily by means of screws and/or pins. The base causes the cover plate to be supported on the rocker.

In alternative or supplementary embodiments of the bread cutting machine according to the invention, the cover plate and the rocker are connected to one another by pins and/or screws, preferably by one or more angle connectors. The angle connectors bring about a rapidly mountable and reliable positional securing of the cover plate.

Further advantageous embodiments of the invention are characterized in that the cover plate is formed integrally with the rocker. In this embodiment, the cover plate can be mounted simultaneously with the rocker. Due to the one-piece connection, the cover plate has very high stability with respect to displacement forces.

Further advantageous embodiments are characterized in that the cover plate has a lateral recess, which is dimensioned such that the circular blade in the waiting position can project into the recess at most so far that it does not quite reach the side of the cover plate facing away from the blade. Further installation space can be saved by the circular blade projecting in the direction of the guide gap to the height of the cover plate.

Another preferred embodiment of the bread cutting machine according to the invention is characterized in that the cover plate has a bevel. As a result, installation space can likewise be saved, wherein a bevel is comparatively simple to manufacture.

The bread cutting machine, the cover plate may have a thickness between 2 mm and 10 mm, preferably 3 mm, and/or the rocker may have a thickness between 3 mm and 10 mm, preferably 6 mm. The rocker serves as part of the support for the cuttable material when the circular blade is in the waiting position, and typically has a greater thickness than the cover plate for stability reasons. The width of the rocker and/or of the cover plate is determined, among other things, by the travel path of the rocker and/or of the cover plate and by the width and position of the extension gap. The width of the rocker is in particular 81 mm to 85 mm, preferably 83 mm. The cover plate is preferably as wide as the rocker.

Embodiments of the bread cutting machine according to the invention, with which the cover plate and/or the rocker are made of plastic, preferably of the same plastic, are more particularly preferred. By means of plastic, the cover plate and the rocker can be designed to be stable at a comparatively low weight. Alternatively, the rocker and/or the cover plate may be designed as a sheet metal part. The cover plate and/or the rocker may be formed as lattices.

In a further embodiment of the bread cutting machine, the rocker has continuous recesses, which are preferably arranged in the region of the rocker with which the rocker is mounted below the cuttable material during cutting operation. During the cutting process, the rocker supports the bread. Crumbs or bread crumbs produced during cutting can fall through the recesses. The bread crumbs are collected in particular in a crumb drawer for disposal. The recesses bring about a reduction in weight and a reduction in the inertia of the rocker.

The cover plate may be designed in several parts. It is then possible to displace or swivel only individual parts of the cover plate or to displace or swivel individual parts of the cover plate to different extents.

In the bread cutting machine according to embodiments of the invention, there is in particular a rocker positively coupled to the blade arm. This rocker is preferably made of plastic and disappears to the side below a shaft plate on which in particular the bread rests during the cutting process when the blade arm moves forward. The rocker has primarily two functions. Firstly, it serves as a support for the cut bread and secondly, it serves as a cover or obstacle to the movable components underneath the shaft plate. In the prior art, however, the blade slot or extension gap remains open. While inserting or removing the bread, the operator of the bread cutting machine may thus intentionally or unintentionally reach through the blade slot to the standing blade or circular blade. In order to increase safety, a vertical plate or cover plate is attached to the rocker, for example by screwing, gluing, welding. The vertical plate opens and closes the blade slot synchronously with the rocker. When the blade is in the parked position or waiting position, the blade slot is thus covered either partially (so that only a non-dangerous slot remains) or completely. Consequently, the danger zone is also covered.

An alternative possibility for increasing the protection from the circular blade in the waiting position is that the circular blade in the waiting position is farther away from the extension gap or blade slot, in particular in the extension direction, than in the bread cutting machines known from the prior art. Then, it is more difficult to reach into the slot and touch the blade. However, the bread cutting machine must be of comparatively wide design so that the circular blade can retract further.

As a further possibility for increased protection from the circular blade, a lateral plate may be pressed from the side against the circular blade in the rest position or waiting position, or the circular blade may be pressed against a lateral plate. When touching the circular blade from the front in the direction of the cutting edge of the circular blade, the lateral plate can stop the fingers of the user. However, this protective mechanism is comparatively complex.

Moreover, the circular blade could move laterally away from the extension gap and can then no longer be touched. However, this protective mechanism is also comparatively complex.

Further advantages of the invention arise from the description and the drawings. According to the invention, the features mentioned above and below can also be used individually or in any combination. The embodiments shown and described are not to be understood as an exhaustive list but have exemplary character for describing the invention.

FIG. 1 shows an isometric view of the bread cutting machine according to an embodiment of the invention.

FIGS. 2a to 4b show the bread cutting machine with the circular blade in various positions in plan views and isometric views. FIGS. 5a to 6c show the circular blade as well as a rocker with a cover plate in various positions in a detailed view.

The bread cutting machine 10 shown in FIG. 1 comprises a cutting device 11 in a machine housing 12. The cutting device 11 has a rotatably mounted circular blade 13. The circular blade 13 can be moved out of the machine housing 12 into a cutting space 14 of the bread cutting machine 10. The cutting space 14 serves to receive bread (not shown) that is being cut by the circular blade 13. In this case, the bread is inserted into the cutting space 14 between a slider 15 and the circular blade 13 and is displaced by the slider 15 orthogonally to the movement direction or extension direction 16 of the circular blade 13. The bread is cut into slices by a rectilinear back-and-forth movement of the rotating circular blade 13. The bread cutting machine 10 furthermore has a hood 17 covering the circular blade 13 when in the cutting space 14, wherein the bread cutting machine 10 has a protrusion 32 that engages with the hood 17 to form an exemplary locking mechanism.

Figure 2A:
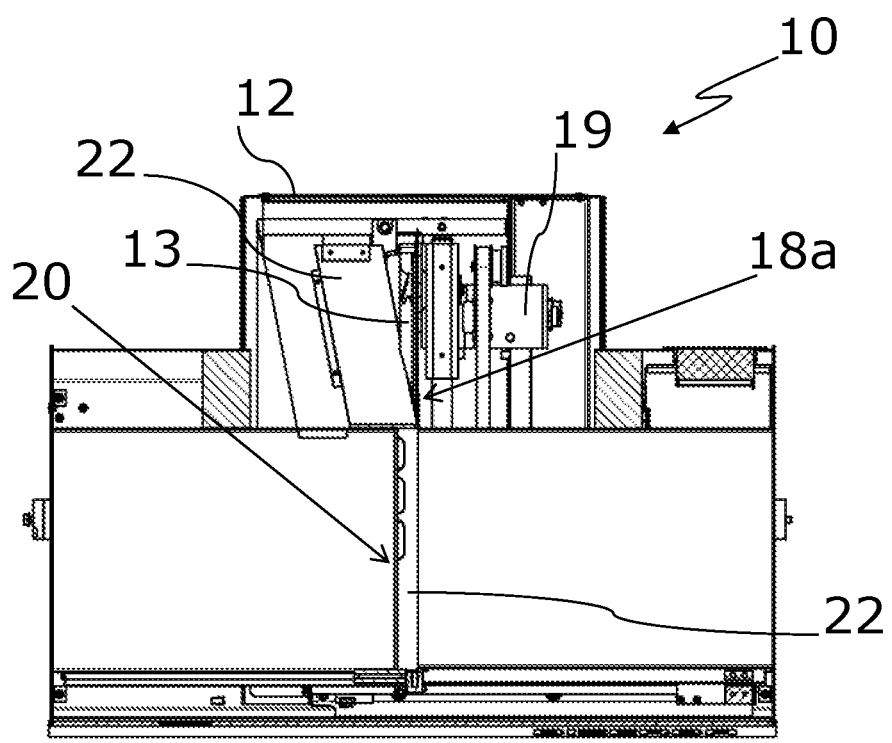
FIG. 2a a plan view of a section through the bread cutting machine according to the invention with a circular blade of the bread cutting machine in a waiting position.
Figure 2B:
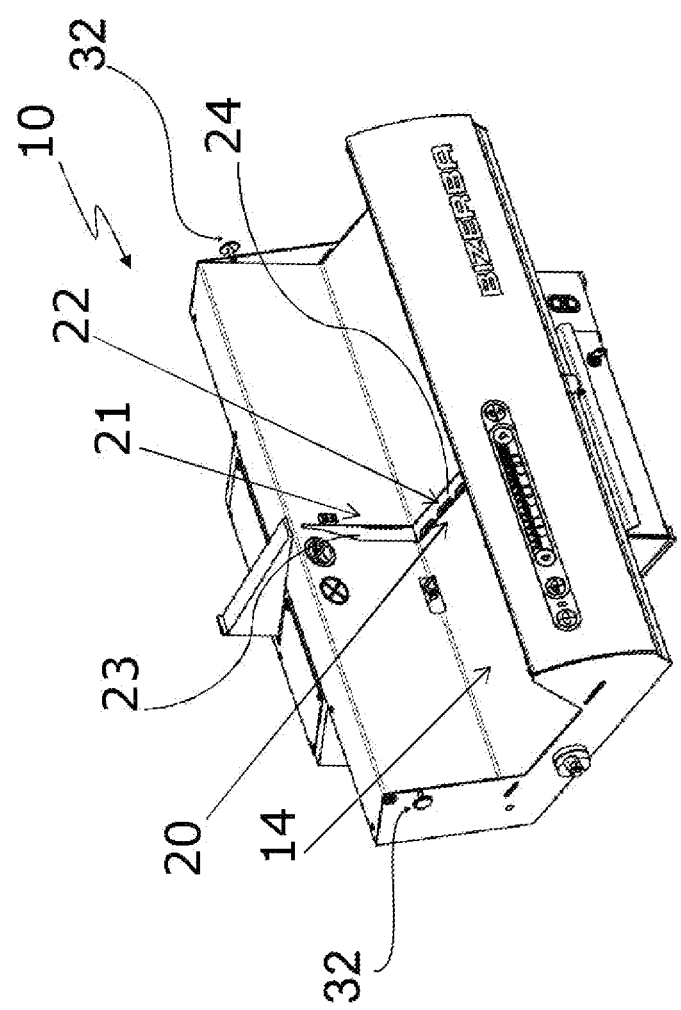
FIG. 2b an isometric view of the bread cutting machine according to the invention without the hood with the circular blade in the waiting position.

Before start-up, the circular blade 13 is mounted in a waiting position 18a in the machine housing 12 as shown in FIG. 2a. A motor 19 enclosed by the machine housing 12 serves to drive the circular blade 13. The cutting space 14 has a guide gap 20 in which the circular blade 13 is guided. As shown in FIG. 2b, in the machine housing 12 is formed an extension gap 21 through which the circular blade 13 can be moved from the waiting position 18a in the machine housing 12 into the cutting space 14. The guide gap 20 is covered by a rocker 22. The rocker 22 protects the user from inadvertently reaching into the guide gap 20. The rocker 22 also serves as part of the support for the bread before or after the cutting process. The bread cutting machine 10 according to the invention differs from the bread cutting machines known from the prior art primarily in that the extension gap 21 is covered by a cover plate 23. The cover plate 23 is rigidly fastened to the rocker 22 on its cuttable-material-side surface 24 and projects essentially vertically away from the rocker 22.

Figure 3A:
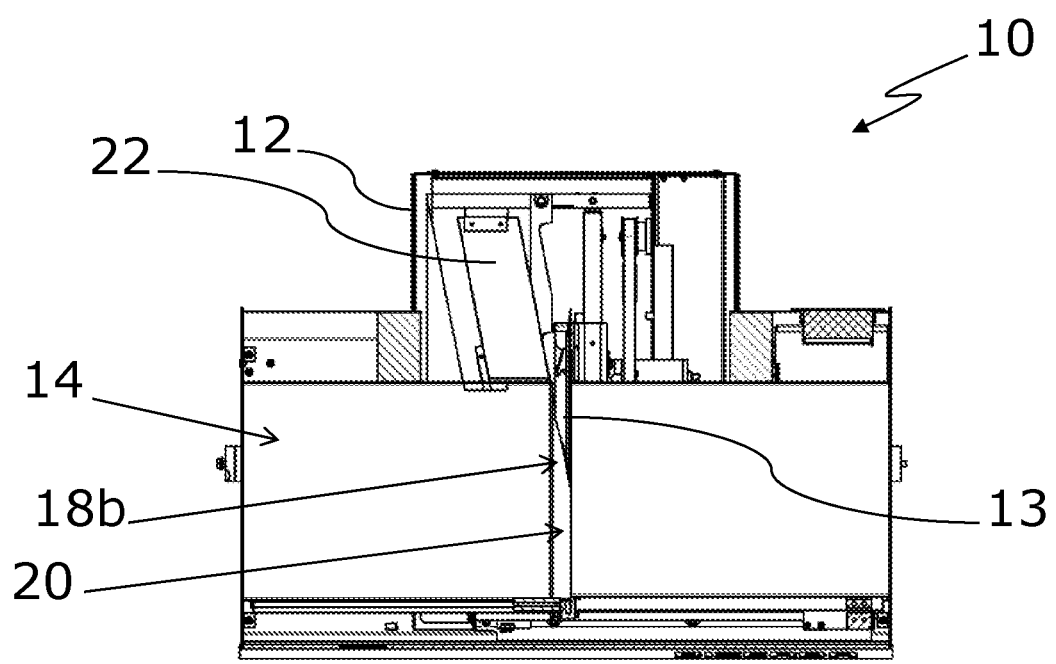
FIG. 3a a plan view of a section through the bread cutting machine according to the invention with the circular blade in a middle position.
Figure 3B:
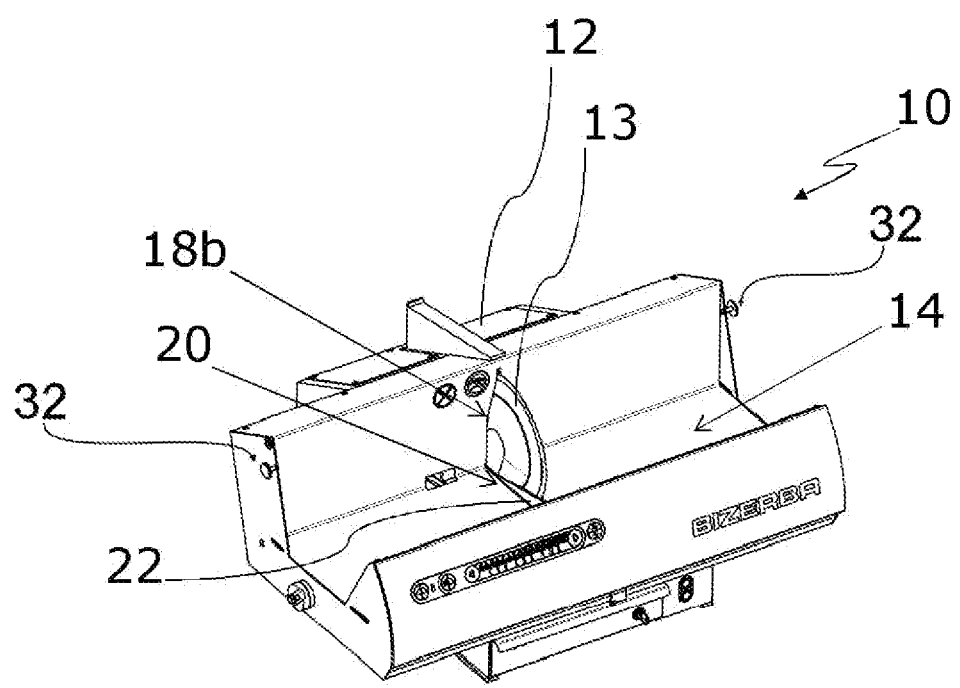
FIG. 3b an isometric view of the bread cutting machine according to the invention with the circular blade in the middle position.

When the circular blade 13 is arranged in a middle position 18b in which it is partially located in the machine housing 12 and partially located in the guide gap 20 in the cutting space 14, the rocker 22 is displaced to the side, as can be seen in FIG. 3a. It is partially located below the cutting space 14 and partially covers the guide gap 20 in the region in which the circular blade 13 is not located, as shown in FIG. 3b.

Figure 4A:
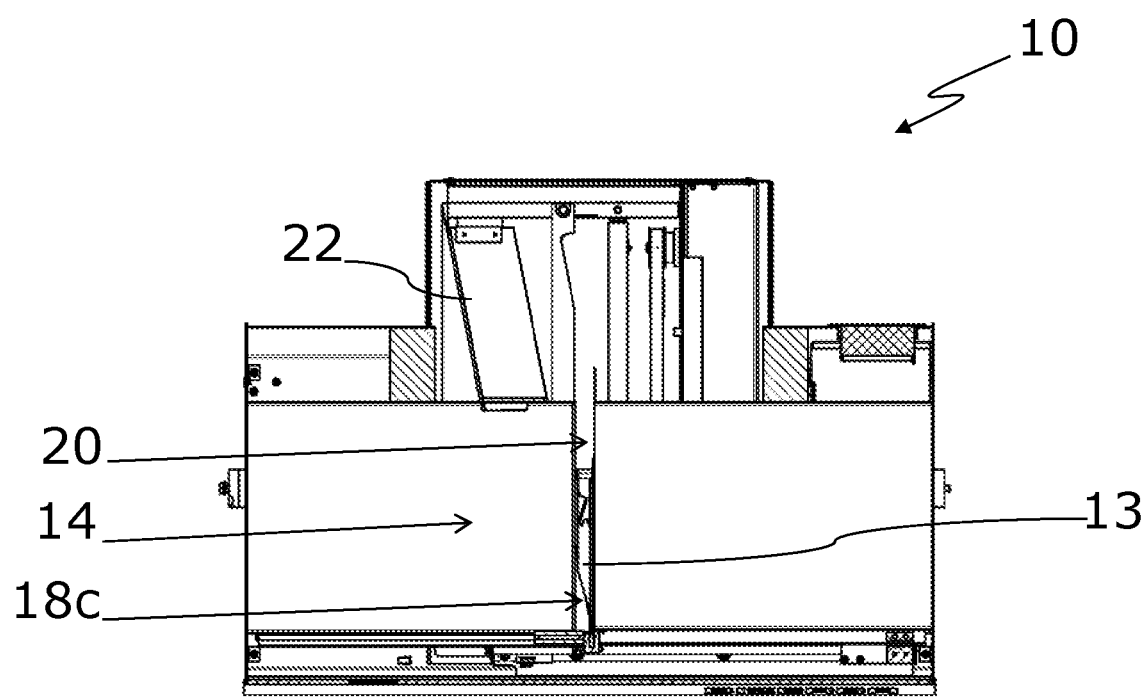
FIG. 4a a plan view of a section through the bread cutting machine according to the invention with the circular blade in a maximally extended position.
Figure 4B:
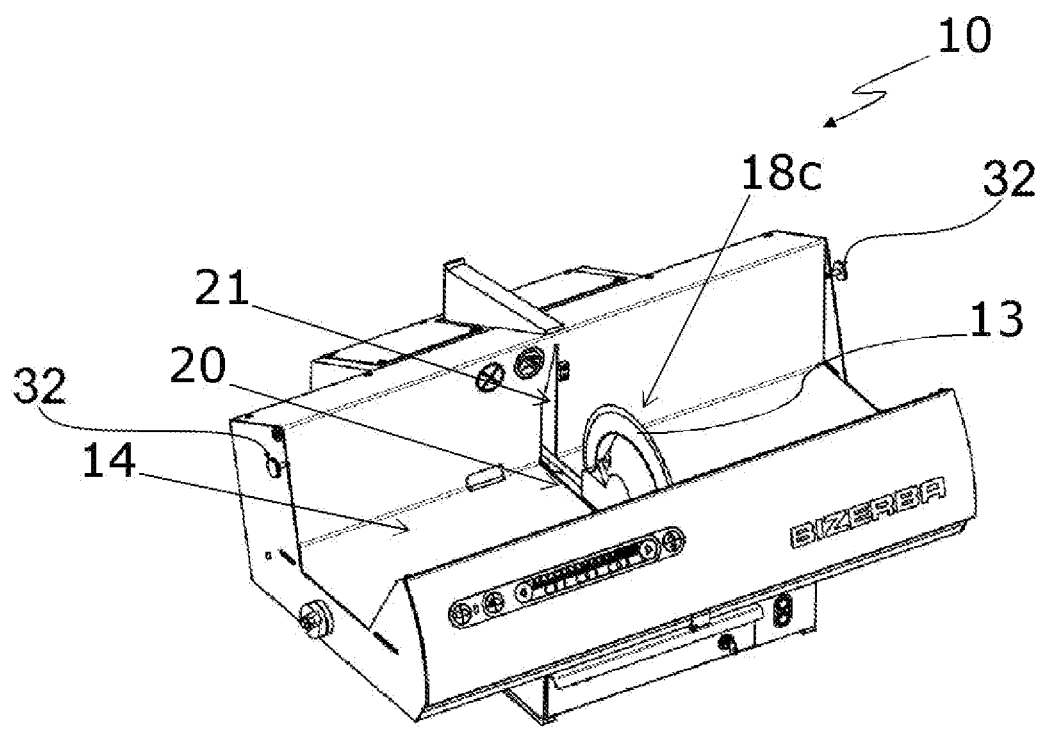
FIG. 4b an isometric view of the bread cutting machine according to the invention with the circular blade in the maximally extended position.

When the circular blade 13 is arranged in a maximally extended position 18c in which it is completely located in the guide gap 20 in the cutting space 14 and has the maximum distance from the extension gap 21, the rocker 22 is maximally displaced to the side, as can be seen in FIG. 4a. It no longer covers the guide gap 20 as shown in FIG. 4b. The guide gap 20 is open. The extension gap 21 is also not covered by the cover plate 23 and is completely open.

Figure 5A:
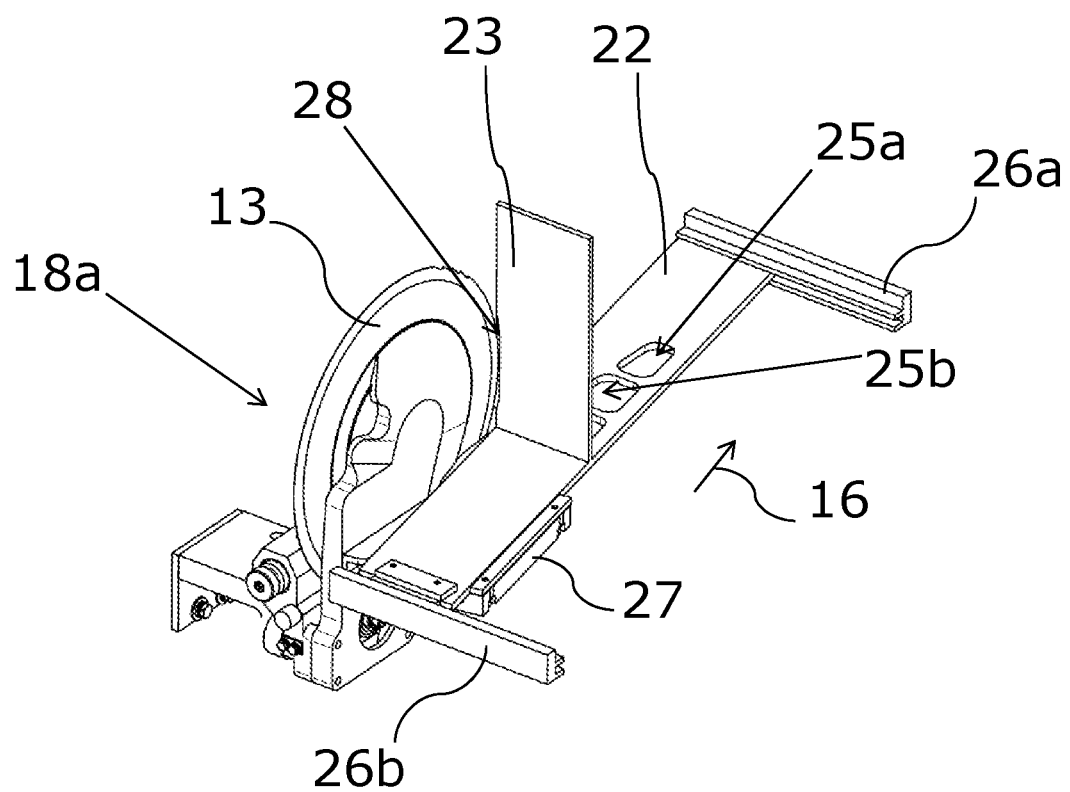
FIG. 5a first isometric detailed view of the circular blade in the waiting position as well as of a rocker and of a cover plate.
Figure 5B:
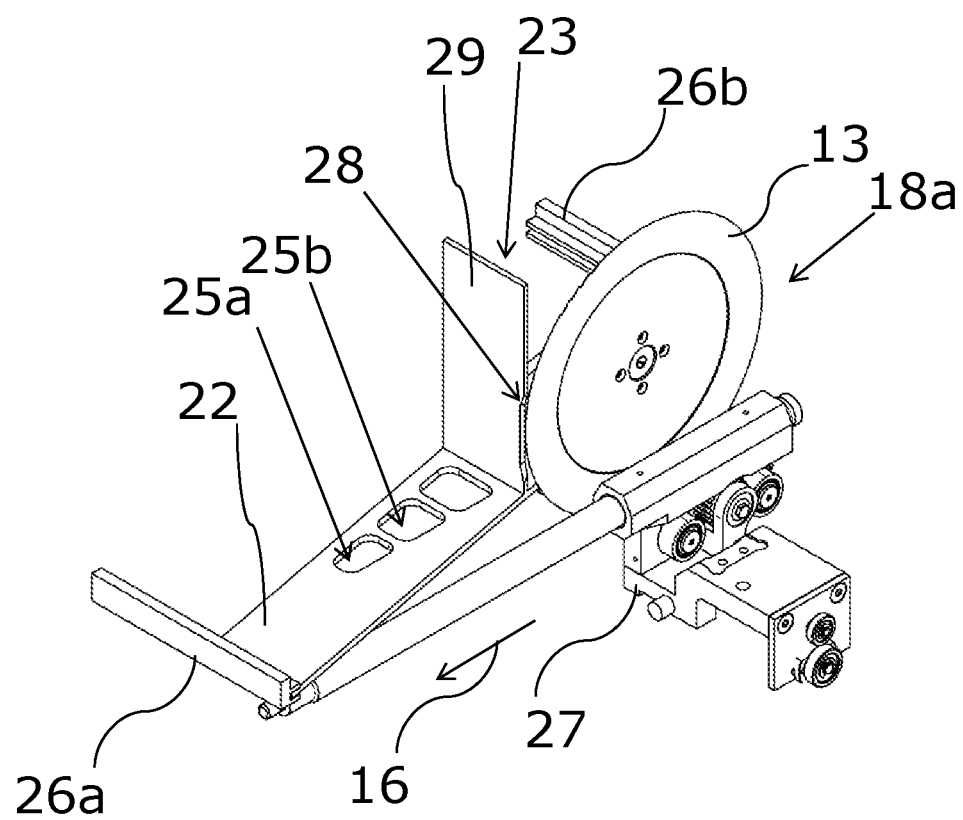
FIG. 5b a second isometric detailed view of the circular blade in the waiting position as well as of the rocker and of the cover plate, wherein the second isometric detailed view is rotated by 180° in comparison to the first isometric detailed view.

The rocker 22 has recesses 25a, 25b which are shown in FIG. 5a and through which bread crumbs produced during cutting fall. It is guided on two rails 26a, 26b which run orthogonally to the extension direction 16 of the circular blade 13 and which are fixedly connected to the machine housing 10. A carriage 27 moves synchronously with the circular blade 13 and displaces the rocker 22 sideways when the circular blade 13 is extended into the guide gap 20. The cover plate 23 has a lateral recess 28. In the waiting position 18a, the circular blade 13 projects into this recess 28 so that the circular blade 13 is located at the height of the cover plate 23 in the extension direction 16 of the circular blade 13. However, the circular blade 13 does not quite reach the side 29 of the cover plate 23 facing away from the circular blade 13, as can be seen in FIG. 5*b*.

Figure 6A:
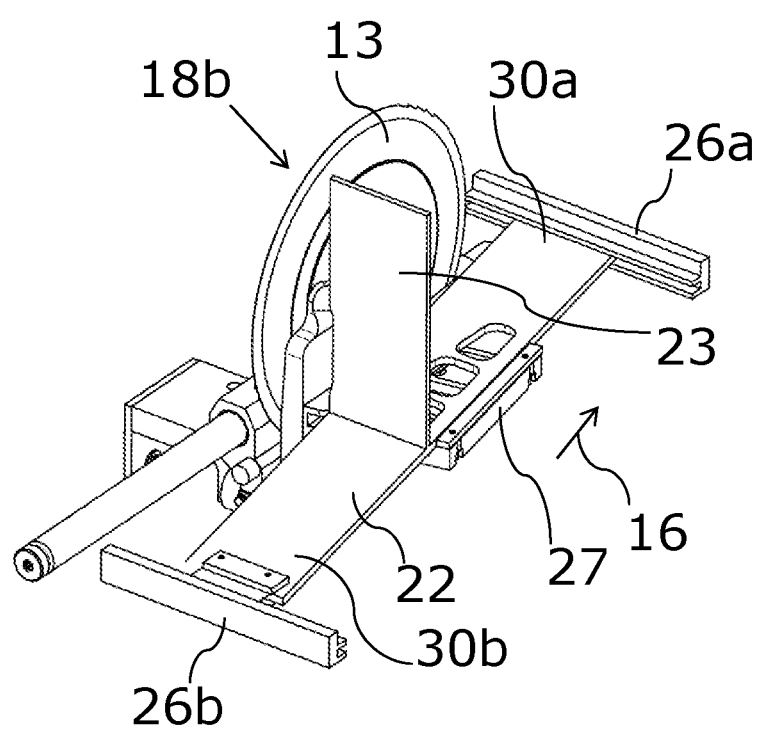
FIG. 6a a first isometric detailed view of the circular blade in the middle position as well as of the rocker and of the cover plate.
Figure 6B:
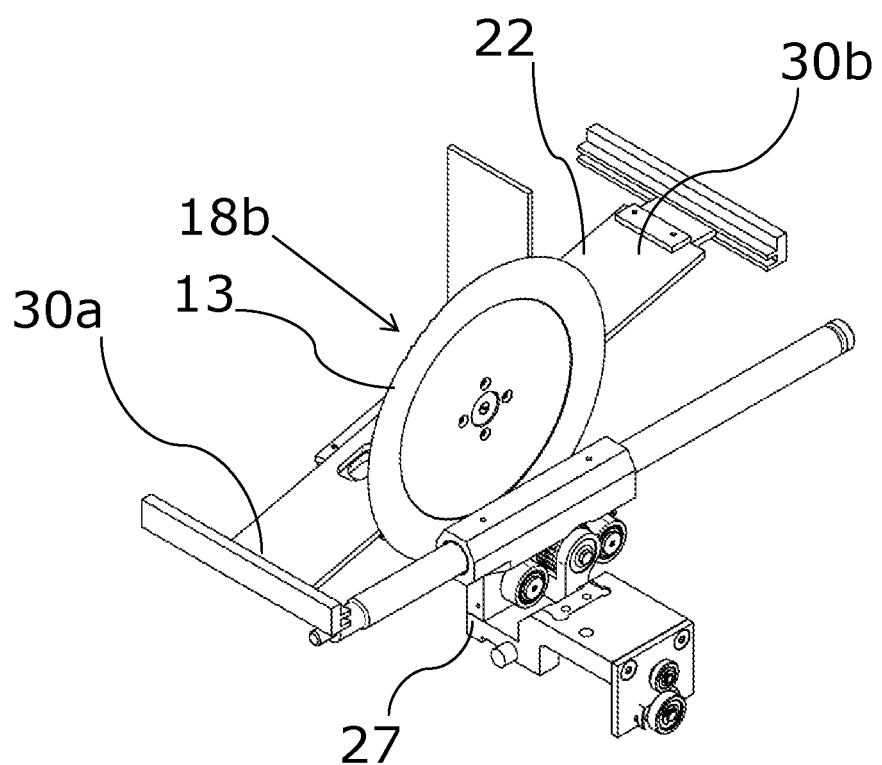
FIG. 6b a second isometric detailed view of the circular blade in the middle position as well as of the rocker and of the cover plate, wherein the second isometric detailed view is rotated by 180° in comparison to the first isometric detailed view.
Figure 6C:
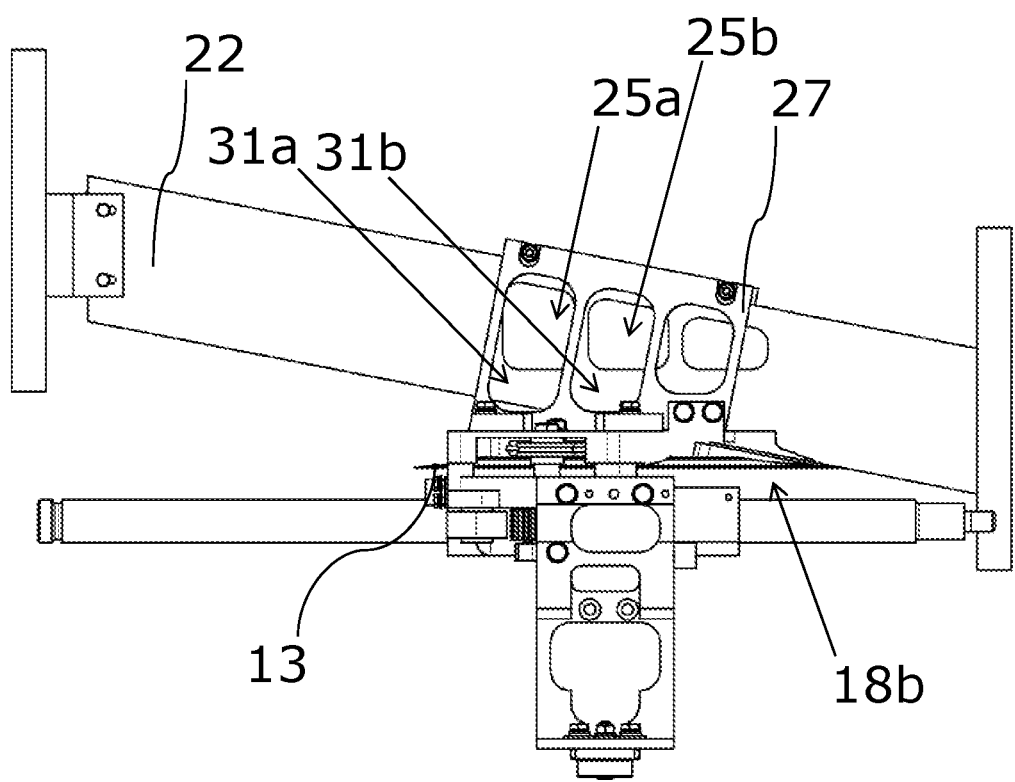
FIG. 6c a bottom view of the circular blade in the middle position as well as of the rocker and of the cover plate.

In a central arrangement 18*b* of the circular blade 13, the rocker 22 is laterally displaced with the rigidly connected cover plate 23 such that the ends 30*a*, 30*b* of the rocker 22 are centrally positioned in the rails 26*a*, 26*b*, such as FIGS. 6*a* and 6*b* show. The carriage 27, which laterally displaces the rocker 22, also has openings 31*a*, 31*b*, which at least partially overlap with the recesses 25*a*, 25*b* of the rocker 22 so that bread crumbs can fall through them, as shown in FIG. 6*c*. In the extension direction 16, the circular blade 13 is largely located beyond the cover plate 23 in the cutting space 14, cf. FIG. 3*a*.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE SIGNS

10 Bread cutting machine
11 Cutting device
12 Machine housing
13 Circular blade
14 Cutting space
15 Slider
16 Movement direction of the circular blade
17 Hood
18*a* Waiting position of the circular blade
18*b* Central position of the circular blade
18*c* Maximally extended position of the circular blade
19 Motor
20 Guide gap
21 Extension gap
22 Rocker
23 Cover plate
24 Cuttable-material-side surface
25*a, b* Recesses of the rocker
26*a, b* Rails
27 Carriage
28 Lateral recess of the cover plate
29 Facing-away side of the cover plate
30*a, b* Ends of the rocker
31*a, b* Openings of the carriage
32 Protrusion

What is claimed is:

1. A bread cutting machine for cutting off slices of cuttable material the bread cutting machine comprising:
    a cutting device comprising a circular blade, which is mounted in a waiting position in a machine housing and configured to be driven by a motor enclosed by the machine housing,
    wherein the circular blade is rotatably fastened to a blade arm,
    wherein a cutting space for the cuttable material is formed on or in the machine housing,
    wherein the cutting space has a guide gap,
    wherein the circular blade is moveable in the guide gap through an extension gap of the machine housing from the waiting position into the cutting space by moving the guide arm,
    wherein a hood for covering the circular blade in operation is arranged on the machine housing,
    wherein the bread cutting machine has a protrusion that engages with the hood,
    wherein when the circular blade is in the waiting position, the guide gap is coverable by a rocker displaceable orthogonally to a movement direction of the circular blade,
    wherein the rocker is displaceable away from the guide gap simultaneously with the extension of the circular blade from the waiting position, whereby the guide gap is opened,
    wherein, a cover plate is rigidly fastened to a cuttable-material-side surface of the rocker, projects vertically away from the rocker, and covers the extension gap whenever the circular blade is in the waiting position, and
    wherein, by a positive guide, the cover plate is moveable away from the extension gap simultaneously with the movement of the rocker, whereby the extension gap is opened.

2. The bread cutting machine according to claim 1, wherein the cover plate is configured to be displaced together with the rocker.

3. The bread cutting machine according to claim 2, wherein the cover plate is configured to be linearly displaced together with the rocker.

4. The bread cutting machine according to claim 1, wherein the cover plate and the rocker have an adhesive connection or a welded connection.

5. The bread cutting machine according to claim 1, wherein the cover plate has a lateral recess which is dimensioned such that the circular blade in the waiting position is projectable into the recess at most so far that it does not reach the side of the cover plate facing away from the blade.

6. The bread cutting machine according to claim 1, wherein the cover plate has a recess.

7. The bread cutting machine according to claim 1, wherein the cover plate has a thickness between 2 mm and 10 mm, and the rocker has a thickness between 3 mm and 10 mm.

8. The bread cutting machine according to claim 7, wherein the cover plate has a thickness of 3 mm, and the rocker has a thickness of 6 mm.

9. The bread cutting machine according to claim 1, wherein the cover plate or the rocker are made of plastic.

10. The bread cutting machine according to claim 1, wherein the rocker has continuous recesses which are arranged in the region of the rocker with which the rocker is mounted below the cuttable material during cutting operation.

11. The bread cutting machine according to claim 10, wherein the carriage has openings which at least partially overlap with the continuous recesses of the rocker.

12. The bread cutting machine according to claim 1, wherein the rocker is displaceable along rails orthogonally to the movement direction of the circular blade.

13. The bread cutting machine according to claim 1, wherein the circular blade projects in the direction of the guide gap up to the height of the cover plate.

\* \* \* \* \*